United States Patent [19]
Sorensen

[11] 3,960,997
[45] June 1, 1976

[54] METHOD OF MANUFACTURING BIAXIALLY STRETCHED SHRINK FOILS AND AN APPARATUS FOR CARRYING THE METHOD INTO EFFECT

[75] Inventor: Leif Brunswig Sorensen, Horsens, Denmark

[73] Assignee: Horsens Plastic A/S, Horsens, Denmark

[22] Filed: June 24, 1974

[21] Appl. No.: 482,673

Related U.S. Application Data
[63] Continuation-in-part of Ser. No. 284,542, Aug. 29, 1972, abandoned.

[30] Foreign Application Priority Data
Aug. 31, 1971 Denmark .......................... 4263/71

[52] U.S. Cl. ................... 264/40; 264/89; 264/95; 264/210 R; 425/72 S; 425/326 R
[51] Int. Cl.² .................. B29D 7/24; B29D 23/04
[58] Field of Search ........... 264/95, 89, 209, 210 R, 264/40; 425/326 R, 72

[56] References Cited
UNITED STATES PATENTS

| | | | |
|---|---|---|---|
| 2,688,773 | 9/1954 | McIntire | 264/95 |
| 2,821,155 | 1/1958 | Seckel | 264/230 |
| 2,916,764 | 12/1959 | Gerber | 264/95 |
| 2,955,321 | 10/1960 | Fortner et al. | 425/326 |
| 3,306,963 | 2/1967 | Wisseroth et al. | 264/95 |
| 3,325,575 | 6/1967 | Last | 264/95 |
| 3,466,356 | 9/1969 | Carlson, Jr. et al. | 264/95 |
| 3,492,693 | 2/1970 | Clarke et al. | 264/95 |
| 3,499,064 | 3/1970 | Tsuboshima et al. | 264/40 |
| 3,522,630 | 8/1970 | Swickard, Jr. | 425/326 |
| 3,687,585 | 8/1972 | Takagi et al. | 264/95 |

FOREIGN PATENTS OR APPLICATIONS
741,962  12/1955  United Kingdom ................. 264/95

Primary Examiner—Jeffery R. Thurlow
Attorney, Agent, or Firm—Beveridge, DeGrandi, Kline & Lunsford

[57] ABSTRACT

A method and apparatus for biaxially stretching plastic material extruded in tubular form to produce a plastic film suitable for subsequent shrinking around an article or articles in packaging processes and the like. An extruded tube of plastic is passed through two spaced apart sets of rollers which are movable axially of the tube relative to each other and the extruder nozzle to increase the pressure of a gas introduced into the tube and forming a bubble between the sets of rollers, the increased pressure increasing the diameter of the bubble between the sets of rollers to a desired amount which stretches the tube transversely to a predetermined degree at the same time it is being stretched longitudinally by the differential rotational speeds of the two sets of nip or squeezing rollers rotating at different speeds.

10 Claims, 8 Drawing Figures

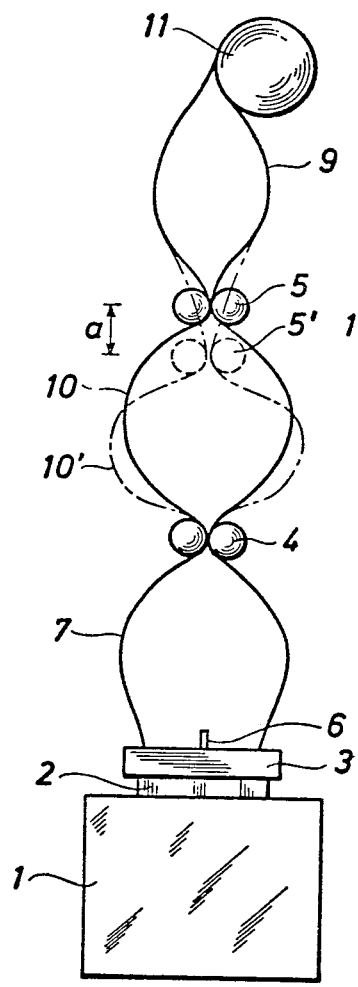
Fig. 1
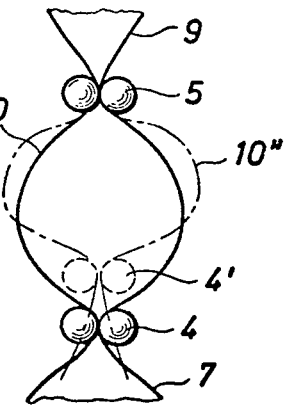
Fig. 2
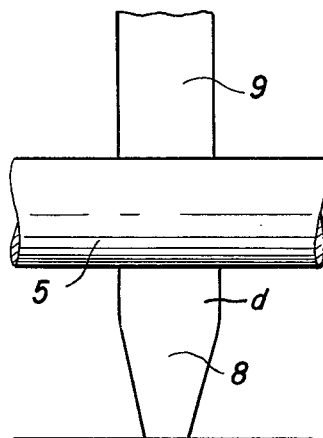
Fig. 7
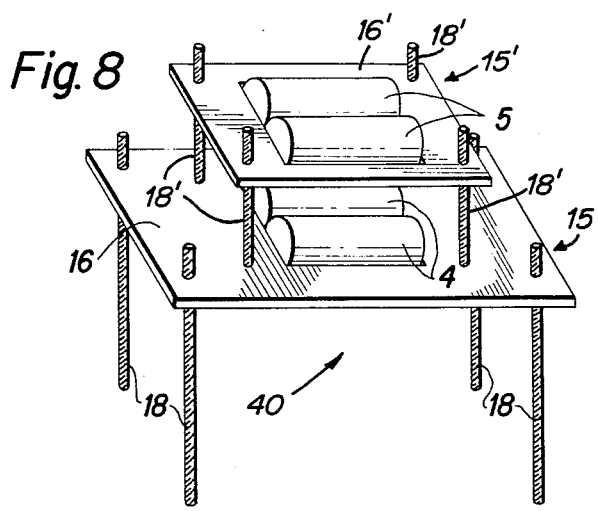
Fig. 8
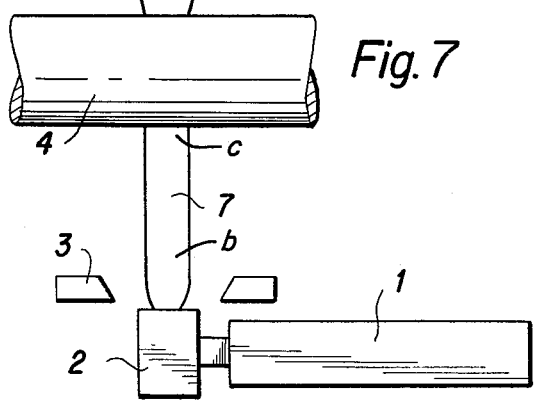

METHOD OF MANUFACTURING BIAXIALLY STRETCHED SHRINK FOILS AND AN APPARATUS FOR CARRYING THE METHOD INTO EFFECT

This is a continuation-in-part application of U.S. patent application Ser. No. 284,542 filed Aug. 29, 1972 now abandoned.

BACKGROUND OF INVENTION

The invention relates to a method of manufacturing biaxially stretched film from a length of plastic material extruded in tubular form from an extruder. In the initial phase a gaseous pressure medium is introduced into the interior of the tube as the first step, the inflated tube being then compressed locally by means of two sets of squeezing rollers, or nip rollers, running at different peripheral speeds so that an intermediate bubble is formed between the two sets of rollers and two additional bubbles are formed between the extruder nozzle and the first set of rollers and between the second set of rollers and a take-up roller, respectively.

This is a continuation-in-part application of U.S. patent application Ser. No. 284,542 filed Aug. 29, 1972 now abandoned. A method is known in which the gas pressure is an intermediate bubble between two sets of rollers is initially raised to a relatively high value, a gas supply pipe introducing gas at a relatively high pressure into the intermediate bubble after passing into the tube from within the annular extruder nozzle, through the first bubble and then between the rollers of the set of squeezing rollers nearest the extruder nozzle and thence into the intermediate bubble. The pressure thereby obtainable in the intermediate bubble is inadequate, and, in addition, there will be leakages between the gas supply pipe and the rollers of the squeezing roller set nearest the extruder nozzle so that the gas leaks out of the intermediate bubble. This is not satisfactory.

It is the object of the invention to devise a method of the aforesaid kind whereby it becomes possible to readily establish and maintain high pressure in the intermediate bubble so that an adequate stretch ratio is attained in the transverse direction of the plastic film.

SUMMARY OF INVENTION

An essential feature of the method, according to the invention, is for the set of squeezing rollers, or nip rollers, remote from the annular extruder nozzle to be movable towards the squeezing roller set nearest the said nozzle, or conversely, or that both sets of nip rollers be movable towards each other after the three bubbles have been produced so that the gas pressure in the intermediate bubble between the two sets of nip rollers increases and the bubble consequently is expanded in the transverse direction. The result obtained in a very simple manner is an increase in the gas pressure in the intermediate bubble so that it is adequately distended and a suitable ratio of stretching in the transverse direction is obtained. It should be observed that the film is stretched in its longitudinal direction by the two sets of nip rollers rotating at different peripheral speeds. The stresses imparted to the plastic film by the stretching operations will, practically speaking, be "frozen down". When the film is subsequently used for packaging an article and subsequently heated to about 75°C (during very few seconds), the film will contract both in its longitudinal and in its transverse direction so as to cling very closely to the article.

In one form of the method, according to the invention in which the two sets of nip rollers are arranged one above the other, the upper set of nip rollers is moved downwardly to establish a pressure inside the intermediate bubble at about 1.5 atmosphere. The fixed position of the set of nip rollers nearest the extruder nozzle causes no change in the cooling conditions of the first bubble adjacent the extruder nozzle so that the expansion of said intermediate bubble between the rollers takes place under better temperature control. The aforesaid pressure has been found appropriate in producing many types of plastic films.

A feature of another form of the method according to the invention is that the upper set of nip rollers — provided the film is a polyolefin — is moved downwardly sufficiently that the ratio of stretching in the transverse direction will be 3:1 and in the longitudinal direction 5:1. As a result, the amount of shrinkage in the film will be about the same in both directions.

The invention is also concerned with an apparatus for carrying out the method. The apparatus comprises two sets of nip rollers, each set of which rotates at different speeds and is located between the annular nozzle of an extruder and a take-up roller. An essential feature of the apparatus is that the two sets of nip rollers are mounted so they may be moved relative to one another so as to change the spacing between them, i.e., the set of rollers most remote from the extruder nozzle is movable toward or away from the set nearest the extruder nozzle, or the set nearest the extruder may be movable with respect to the set most remote from the nozzle or — by means of a separate conveyor unit — both sets of rollers are adapted to be moved towards and away from each other. By means of the apparatus, the method according to the invention, may be carried out in a very simple manner since the gas enclosed between the two sets of nip rollers cannot escape and is fully available for use in distending the intermediate bubble in the transverse direction.

The conveyor unit may include a movably mounted platform having an opening in which either of the two sets of nip rollers are mounted, or each of the two sets may be mounted in an opening within separate platforms mounted for movement relative to each other, as well as the extruder nozzle. As a result, the desired movability of the roller sets is obtained in very simple manner.

The platform in which a set of the rollers is mounted may be adapted to be supported by and moved along screwthreaded rods passed through the platform. Opposite each rod the platform may have an annular recess extending around the individual rod and a rotatable operating member having internal screwthreads is threaded onto each rod, the face of the operating member facing the platform having a circumferential projection cooperating with the recess. This construction provides a reliable movement of the platform since the platform will advance along the rods when the individual operating members are rotated on the rods.

Further, according to the invention, the operating member on each rod may be in the form of a sprocket around which a chain is passed and the chain driven by another sprocket mounted on the shaft of a motor mounted on the platform. As a result, the conveyor unit may be very light in weight.

According to the invention it is also possible for the platform to be moved by hydraulic means. As a result, the hydraulic unit may be moved more precisely.

As noted, the apparatus, according to the invention, may further have two conveyor units, that is, one for each of the two sets of nip rollers.

DESCRIPTION OF THE DRAWINGS

The invention will now be described with reference to the drawings in which:

FIG. 1 is a schematic representation of one embodiment of the apparatus, viewed from the side, in which the set of nip rollers remote from the annular nozzle of the extruder may be moved.

FIG. 2 represents another embodiment of the apparatus in which the set of nip rollers nearest the annular nozzle is movable.

FIG. 7 is a schematic representation of a front view of the embodiments illustrated in FIGS. 1 or 2 but in which the rollers are positioned in their final operating position.

FIG. 8 is a perspective view of another embodiment of the invention utilizing multiple platforms.

DESCRIPTION OF PREFERRED EMBODIMENTS

Figure 3:
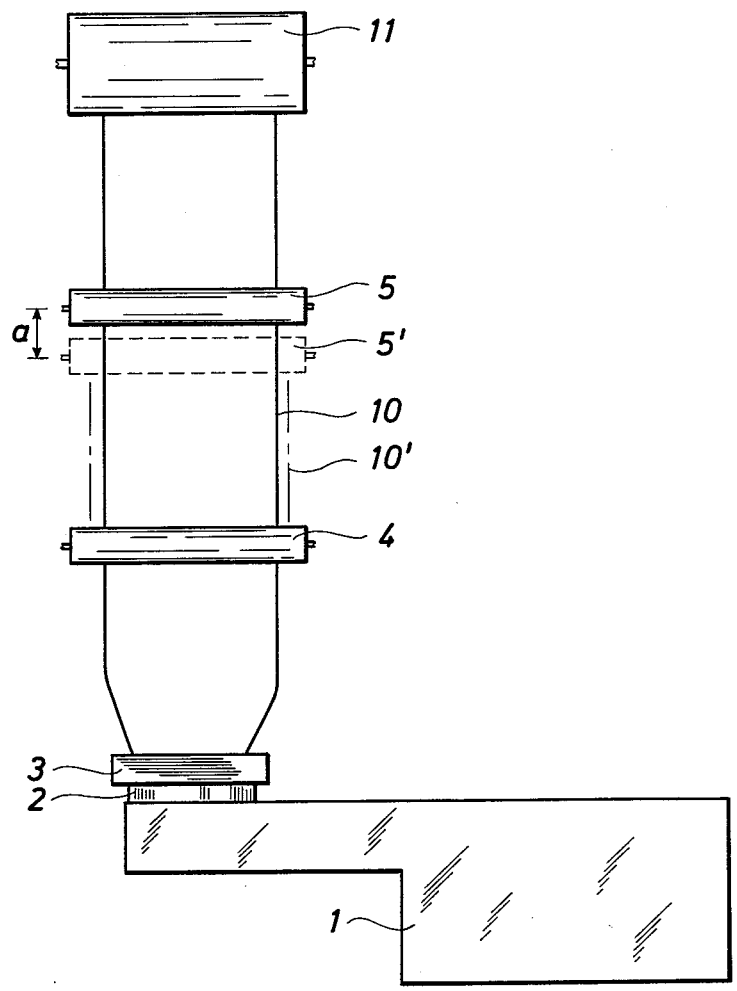
FIG. 3 is a front view of the apparatus of FIG. 1.

The apparatus shown in FIG. 1 consists of an extruder 1 provided with an annular nozzle 2 and a cooling ring 3 which is supplied with cooling air in a manner known per se. Above the nozzle 2 are mounted two sets of nip rollers, that is, a set 4 of nip rollers adjacent the nozzle and a set 5 of nip rollers remote from the said nozzle. The individual rollers in the set 5 and the individual rollers in the set 4 are movable away from and towards each other in horizontal plane. As the tube of plastic is extruded from the annular nozzle with each of the rollers in the sets 4 and 5 moved away from each other, the tube will pass between the individual rollers without restriction. A gas, for example air, is introduced into the interior of the tube through a feed pipe 6 within the extruder nozzle. The roller set 5 may be moved in a vertical direction toward the rollers 4 so as to be brought into the position indicated by 5′ (dotted lines). When the individual rollers of the roller sets 4 and 5 are moved together against the plastic tube, two outer bubbles 7 and 9 and an intermediate bubble 10 are formed. The top of the upper bubble 9 is defined by a takeup roller 11 on which the stretched plastic film is wound.

Stretching of the extruded plastic tubing in its longitudinal direction is effected by the set 5 of nip rollers being operated at a greater peripheral speed than the set 4 of nip rollers, in a manner known per se. Stretching of the extruded tubing in the transverse direction is effected by the vertically downward movement of the roller set 5 to the position 5′ after the rollers of the sets 4 and 5 have been moved together to pinch the tube together between them. The bubble 10 will change its form during this operation so that its diameter increases, of the bubble 10′ indicated by a stippled line in FIGS. 1 and 2. Preferably the gas pressure is thereby increased to about 1.5 atmospheres. The gas or air inside the intermediate bubble 10 (10′) will be effectively trapped and unable to escape at the nip rollers 4 or the nip rollers 5. The distance through which the set of nip rollers 5 may be moved downwards is marked $a$ in FIG. 1. As soon as the upper set of nip rollers has been brought down into the position 5′, which is its actual working position, the continuous production of biaxially stretched shrink film may be commenced.

FIG. 2 shows a part of another embodiment of the apparatus according to the invention, in which the set 4 of nip rollers nearest the extruder nozzle has been moved upwardly to position 4′, by which the intermediate bubble 10 is squeezed from above and below so that its diameter increases to produce the bubble 10″, indicated by a stippled line in FIG. 2, and as a result there will be a considerable increase in the stretching of the extruded tube in the transverse direction. FIG. 3 also illustrates how the diameter of the intermediate bubble 10 is increased to produce the bubble 10′ when the nip roller set 5 is moved downwardly through the distance $a$ to the position 5′.

Figure 4:
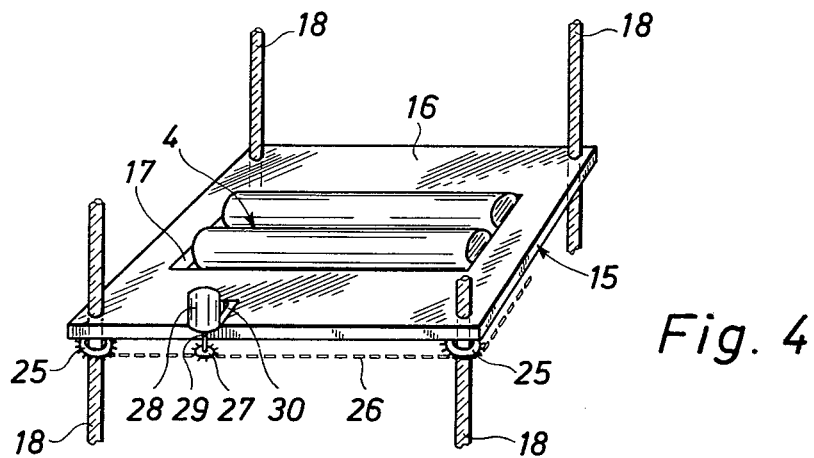
FIG. 4 is a perspective view of a conveyor unit in which a set of nip rollers is mounted.
Figure 5:
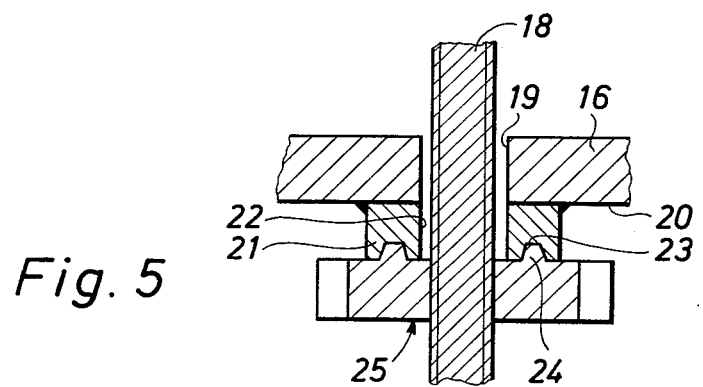
FIG. 5 is a partial vertical section of FIG. 4 taken through a vertical rod on which the platform is supported and the surrounding platform with operating member and sprocket.

FIG. 4 shows a conveyor unit 15, by means of which it is possible to move a set of rollers, for example the set 4 of nip rollers, up and down in relation to the annular nozzle 2. The unit 15 consists of a platform 16 having a rectangular opening 17 in which the nip roller set 4 is mounted. The conveyor unit 15 is equally suitable for moving the roller set 4 and for moving the roller set 5. The unit 15 is supported for movement along four screwthreaded rods 18 passing through the four holes 19 in the platform (FIG. 5), the holes 19 being slightly larger in diameter than the rods 18. An annular boss 21 having a central hole 22 of the same diameter as the hole 19 is welded to the underside 20 of the platform 16 and has an annular recess 23 on its underside. The recess 23 is engaged by an annular projection 24 located on the upper side of an operating member 25, in the form of a sprocket. The sprocket, or operating member 25, has a central, screwthreaded hole threadable onto the external screwthread of the rod 18, so that the platform 16 will be moved up and down along the rod when the sprocket 25 is turned. During this turning movement the projection 24 slides within the recess 23.

FIG. 4 shows only the sprockets 25 threaded onto the two front rods 18. These sprockets are rotatable by means of an endless chain 26 passing around the sprockets with the chain being driven by another sprocket 27 which is mounted on the drive shaft 29 of the electric motor 28 mounted on the platform 16 by a suitable attachement 30. For the sake of clarity the means for driving and moving the rollers of the squeezing roller sets 4 and 5 are not shown. There is nothing to prevent the conveyor unit 15 from being moved hydraulically or pneumatically. In that case the platform 16 is connected with plungers of cylinders into which a fluid under pressure is fed.

Figure 6:
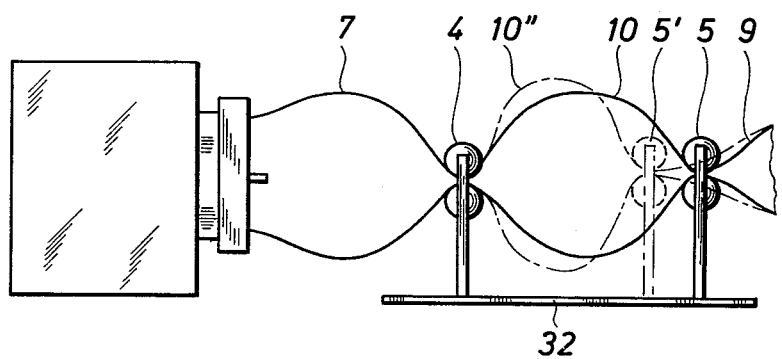
FIG. 6 shows a third embodiment of the apparatus according to the invention, in which at least one set of nip rollers may be moved in horizontal direction.

A plastic that is very suitable for biaxial stretching according to the invention is a polyolefin. An optimum shrinkability is obtained if the ratio of stretching in the longitudinal and transverse directions are established at 5:1 and 3:1 respectively since this results in equal shrinkage in both directions and the relative dimensional integrity of decorative or written matter printed on the stretched film is maintained after shrinkage so there is no distortion. Instead of being arranged one above the other, the two sets of nip rollers may be arranged side by side so that both sets, or only one set, can be moved in horizontal direction. FIG. 6 shows schematically how a set of nip rollers may be moved horizontally (into the position 5') in relation to the other set of rollers 4, so that the intermediate bubble 10'' is distended in the transverse direction. The roller sets in this case may also be mounted on conveyor units. These are indicated schematically by 33 and may be moved to and fro in horizontal direction. If desired, they may cooperate with a fixed horizontal rack 32.

In producing a satisfactory shrink film it is important that the thickness of the extruded plastic tubing, that is being biaxially stretched, be carefully controlled not only with respect to thickness but also the uniformity of thickness. In the basic process and the apparatus previously described the plastic material is extruded in thin tubular form from a circular extruder die, is cooled to below the melting point by the cooling ring immediately adjacent the extruder die and then is further cooled by ambient air as it passes upwardly to and then through the two sets of nip rollers while being biaxially stretched in the manner described. The temperature at which the biaxial stretching of the tubing takes place is important so that positioning the first set of the nip rolls at that distance from the cooling ring as will establish the optimum temperature from commencing the stretching operation is most helpful in producing a high quality shrink film. For this reason supporting both sets of nip rolls in a manner that both sets are movable axially of the tubing is highly advantageous, permitting the set of rollers 4 nearest the extruder to be located at that distance from the cooling ring 3 as will cause the extruded tubing at that location to have cooled (by ambient air) to an optimum temperature for stretching and then, after the bubbles have been formed, the second set of rollers 5 is moved to that location at which the maximum diameter of the intermediate bubble 8 is such as to establish the desired transverse stretch ratio in the tubing.

Reference is made to FIG. 7 for a further description of the operation of an optimum method and embodiment of apparatus in the production of biaxially stretched shrink film. The raw plastic material is introduced into the extruder 1, in which it is plasticized at an elevated temperature, and extruded from a circular die or nozzle 2 in tubular form after which it flows through the cooling ring 3 that cools the extruded tube to below the melting point of the plastic material, for example by blowing cold air from the cooling ring over the extruded tube. This establishes the extruded tube at an even thickness.

To initiate production, the individual rolls of each of the two sets of the nip rollers 4 and 5 are withdrawn from one another and the extruded tubing is passed through both sets of nip rollers toward the take-up roller, following which gas (preferably air) is introduced into the extruded tubing through the supply pipe 6. Thereafter the individual rollers of each of the two sets 4, 5 of nip rollers are brought together to pinch closed the gas filled tubing at the nip rollers and the position of the two sets of nip rollers is adjusted to place the set of nip rollers 4 nearest the extruder at that distance from the cooling ring 3 as will establish the orientation or stretched section 8 of the tubing (the intermediate bubble) at the preferred temperature. The peripheral speed of the furthermost set of nip rollers 5 is set at a suitably higher speed than the nearest set of nip rollers 4 to obtain the desired stretch ratio in the longitudinal direction of the tubing. Therefore, the distance between the two sets of nip rollers 4 and 5 is adjusted to increase the pressure within the intermediate bubble or orientation section 8 as will expand the section 8 to a diameter as will establish the desired stretch ratio in the transverse direction of the tubing. In practice it has been found necessary, in order to maintain a uniform thickness in the stretched film, to achieve a circular cross section in the bubble in the lowermost portion of the expansion section (intermediate bubble) 8. A gradual expansion of the tubing within the expansion section in a generally pear shaped form produces a biaxially stretched film of uniform wall thickness and is achieved by establishing the correct differential speeds between the two sets of nip rollers 4 and 5, achieving a desired temperature of the tubing in the expansion region between the two sets of nip rollers by a proper spacing of the sets of nip rollers from the cooling ring 3 and extruder die 2 and establishing an optimum distance between each of the two sets of nip rollers after they have been pinched together on the tubing to expand the tubing to the desired diameter. Of course, it would be possible to first adjust the spacing between the two sets of nip rollers before adjusting the spacing between the cooling ring 3 and the nearest nip roller set 4 but the previously discussed procedure appears to be preferable.

FIG. 8 illustrates a convenient embodiment for supporting both sets of nip rollers when carrying out the process that has been discussed above with respect to FIG. 7. The expansion unit 40 in the illustration comprises two conveyor units 15 and 15' that are each substantially a duplicate of the conveyor unit 15 of FIG. 4. For purposes of simplicity in FIG. 8, the sprocket operating members, chain and driving motor are not illustrated. The threaded rods 18, on which the one roller platform 16 is supported, are mounted on a base supporting structure for movement relative to the extruder nozzle and cooling ring. The rods 18', on which the other roller platform 16' is movably supported, are most conveniently supported for rotation by the first platform 16 but, of course, could be supported from a fixed base as are the support rods 18. By having the second nip roller platform 16' supported from the first nip roller platform 16, the entire expansion unit 40 may be moved axially of the extruded tubing as an integral unit.

EXAMPLE I

A suitable shrinkable, biaxially stretched film can be produced in accordance with the described invention from a polyethylene vinyl-acetate copolymer marketed under the trademark of Baylon Vlo M564. This material was melted in the extruder to reach temperatures of 230°F. and 290°F. at different zones within the extruder so as to be extruded from the die at approximately 260°F. Cooling was applied by air blasts from cooling ring 3 to cool the tubing to about 195°F. immediately above the cooling ring 3 at point b noted in FIG. 7. The diameter of the extruded and air filled tubing 7 between the cooling ring and lower set of rollers 4 was 3 inches and the set of nip rollers 4 nearest the extruder was located 23 inches above the nozzle exit of the extruder die 2, the extruded tubing becoming cooled to about 175°F. at point c shortly before it entered the lower set of nip rollers with the tubing reaching about 165°F at the lower set of nip rollers 4 which were rotated at 12 rpm. The second set of nip rollers 5 was positioned 24 inches above the first set 4 and rotated at 24 rpm. such that the diameter of the intermediate bubble or expansion section 8 of the tubing was expanded to 5½ inches and was at a temperature of about 155° F. at point d approximately midway between the two sets of nip rollers. The bubble of stretched tubing 9 leaving the upper set of nip rollers 5 remained at a diameter of 5½ inches and was rolled up on the take-up roller (not illustrated in FIG. 7) at a temperature of about 77°F. The final film on the take-up roller had a flat tubular width of about 8 inches and a thickness of 0.002 inch. The shrinkage effect of this film measured at 203°F. in water was 48% in the longitudinal direction and 42% in the transverse direction.

EXAMPLE II

Another suitable shrinkable, biaxially stretched film can be produced from a polyolefin ionomer resin sold under the trademark of Surlyn 1603. This material was melted in the extruder to reach temperatures of 300°F., 425°F. in respective zones of the extruder so as to be extruded from the die at approximately 410°F. Cooling was applied by air blasts from the cooling ring 3 to cool the tubing to about 194°F. immediately above the cooling ring at a point b (FIG. 7). The diameter of the air filled extruded tubing 7 between the cooling ring and the lower set of nip rollers was again three inches and the set of nip rollers 4 nearest the extruder was located 22 inches above the nozzle exit of the extruder die 2, the extruded tubing becoming cooled to about 167°F. at point c shortly before it entered the lower set of nip rollers with the tubing reaching about 165°F. at the lower set of nip rollers 4 which were rotated at 12 rpm. The second set of nip rollers 5 was positioned 24 inches above the first set 4 and rotated at 26 rpm, such that the diameter of the intermediate bubble or expansion section 8 of the tubing was expanded to 5½ inches and was at a temperature of about 160°F. at point d approximately midway between the two sets of nip rollers. The bubble of the stretched tubing 9 leaving the upper set of nip rollers 5 remained at a diameter of 5½ inches and was rolled up on the take-up roller at a temperature of about 77°F. The final film on the take-up roller had a flat tubular width of about 8 inches and a thickness of 0.0012 inches. The shrinkage effect of the film measured at 167°F. in water was 36% in the longitudinal direction and 33% in the transverse direction.

EXAMPLE III

Another shrinkable, biaxially stretched film was produced from the polyolefin ionomer resin marketed under the trademark of Surlyn 1603. It was extruded at the same temperatures of Example II such that the tubing was extruded from the die at approximately 410°F. Cooling was applied by the cooling ring 3 such that the tubing was cooled to the temperature of approximately 194°F immediately above the cooling ring at point b (FIG. 7). The diameter of the air filled extruded tubing 7 between the cooling ring and lower set of nip rollers was again 3 inches and the set of nip rollers 4 nearest the extruder was located 24 inches above the nozzle exit of the extruder die 2 the extruded tubing becoming cooled to about 167°F. at point c shortly before it entered the lower set of nip rollers with the tubing reaching about 165°F. at the lower set of nip rollers 4 which were rotated at 12 rpm. The second set of nip rollers 5 was positioned 23 inches above the first set 4 and rotated at 24 rpm. such that the diameter of the intermediate bubble or expansion section 8 of the tubing was expanded to 7½ inches and was at a temperature of about 160°F. at point d approximately midway between the two sets of nip rollers. The bubble of stretched tubing 9 leaving the upper set of nip rollers 5 remained at the diameter of 7½ inches and was rolled up on the take-up roller at a temperature of about 77°F. The final film on the take-up roller had a flat tubular width of about 10 inches and a thickness of 0.002 inches. The shrinkage effect of this film measured at 160°F. in water was 40% in the longitudinal direction and 37% in the transverse direction.

I claim:

1. A method of biaxially orienting plastic material comprising the steps of extruding a length of molten orientable plastic material in tubular form from the orifice of an extruder and passing the extruded length between opposing rollers of each of a first set and a second set of roller pairs of which the opposing rollers of at least said first pair are sufficiently separated that the tubing length is not pinched closed by the separated rollers, said first and second sets of roller pairs being spaced-apart and movable relative to the extruder orifice in the direction of the extruded tubing length with said first set being nearest said extruder orifice, introducing gas under pressure into the interior of said extruded length of tubing from within the orifice of said extruder and directing cooling air toward said first set of roller pairs along the exterior wall of the molten tubing leaving said extruder orifice to cool the tubing to an orientable temperature, clamping together the separated, opposing rollers and pinch closed the gas filled tubular length at the respective spaced-apart roller set locations to form a plurality of bubbles in the length of tubing of which a first bubble lies between said extruder orifice and the first set of said roller pairs and a second bubble lies between said two sets of roller pairs, rotating the rollers of each set of roller pairs at different velocities with the rollers of the second set of roller pairs rotating at a sufficiently higher velocity than the rollers of said first set that the tubing between said two sets of rollers is stretched in its lengthwise dimension a predetermined amount, adjusting the distance between said first set of roller pairs and said extruder orifice such that said first bubble is cooled an amount to establish said second bubble at an optimum temperature for orientation stretching and decreasing the distance between said two sets of roller pairs to a shortened optimum spacing as will increase the pressure of the gas within said second bubble an amount to expand the bubble to that predetermined diameter as will stretch the tube an amount in its transverse dimension to create a predetermined ratio between the amount of stretch established in the lengthwise and in the transverse dimensions of the fully stretched tube, and maintaining that optimum spacing between said first set of roller pairs and said extruder orifice and between said two sets of roller pairs as will maintain said second bubble optimum orientation temperature and will maintain said predetermined second bubble diameter while continuing to extrude said length of tubing passing through said sets of rollers clamped thereon.

2. The method of claim 1 wherein said plastic material is a polyolefin and the velocities of roller rotations of the two roller sets and said optimum spacing of the two sets of rollers creating the pressure in said second bubble establish a stretch in the respective lengthwise and transverse dimensions of the tubing in the ratio of approximately 5:3.

3. The method of claim 2 wherein said optimum roller set spacing establishes a pressure within said second bubble of approximately 1.5 atmospheres.

4. The method of claim 1, wherein the opposing rollers of said second set of roller pairs are also sufficiently separated that the length of gas filled tubing initially passing between them is not pinched closed, comprising the additional steps of flattening the tubing to a collapsed condition a distance beyond said second set of roller pairs that said tubing has cooled to a stable solid state for storage and also clamping together said separated rollers of said second set of roller pairs when forming said plurality of bubbles to form a third bubble lying between said second set of roller pairs and the collapsed tubing.

5. The method of claim 4, wherein said tubing is flattened to a collapsed condition by winding the tubing around a takeup roll.

6. The method of claim 1 wherein both said sets of rollers are moved simultaneously at a fixed separation in adjusting the distance between said first set of roller pairs and said extruder orifice to obtain said second bubble optimum temperature and following said adjustment said second set of roller pairs is moved toward said first set of roller pairs to decrease said fixed separation to establish said second bubble increased pressure.

7. An apparatus for biaxially orienting plastic material comprising an extruder from the orifice of which a length of molten orientable plastic tubing is extruded, two sets of pairs of rollers spaced from said extruder orifice at different distances in line with said tubing length, each said set of rollers including a pair of opposing rollers mounted for movement toward and away from each other between a retracted position at which a sufficient space exists between the rollers of said tubing length to pass therethrough without being pinched closed and a clamped position in which the rollers are tightly pressed together to pinch closed the tubing length therebetween, means within the orifice of said extruder for introducing a gas under pressure into the interior of the length of tubing extruded therefrom, means circumscribing said tubing immediately adjacent said extruder orifice for blowing cooling air along the exterior surface of said tubing in the direction of said first set of roller pairs, means for rotating the rollers of each set of rollers at a predetermined and different velocity, the rollers of the set of rollers most remote from said orifice rotating at a higher velocity than the other set of rollers nearest the extruder, and means supporting each of said roller sets for movement of each said set along the length of the tubing toward or away from said extruder orifice and adjusting the location of said roller sets to give optimum orientation of the tubing being drawn into a film between the rollers of said sets, said support means supporting at least one of said roller sets within a cut-out in a platform supported for movement relative to the other roller set by a plurality of threaded rods extending through holes in said platform.

8. An apparatus for biaxially orienting plastic material comprising an extruder from the orifice of which a length of molten orientable plastic tubing is extruded, two sets of pairs of rollers spaced from said extruder orifice at different distances in line with said tubing length, each said set of rollers including a pair of opposing rollers mounted for movement toward and away from each other between a retracted position at which a sufficient space exists between the rollers of said tubing length to pass therethrough without being pinched closed and a clamped position in which the rollers are tightly pressed together to pinch closed the tubing length therebetween, means within the orifice of said extruder for introducing a gas under pressure into the interior of the length of tubing extruded therefrom, means circumscribing said tubing immediately adjacent said extruder orifice for blowing cooling air along the exterior surface of said tubing in the direction of said first set of roller pairs, means for rotating the rollers of each set of rollers at a predetermined and different velocity, the rollers of the set of rollers most remote from said orifice rotating at a higher velocity than the other set of rollers nearest the extruder, and means supporting each of said roller sets for movement of each said set along the length of the tubing toward or away from said extruder orifice, said supporting means including means for supporting said most remote set of rollers for movement toward and away from said extruder both concurrently with movement of said nearest roller set and independently of movement of said nearest roller set.

9. An apparatus for biaxially orienting plastic material comprising an extruder from the orifice of which a length of molten orientable plastic tubing is extruded, two sets of pairs of rollers spaced from said extruder orifice at different distances in line with said tubing length, each said set of rollers including a pair of opposing rollers mounted for movement toward and away from each other between a retracted position at which a sufficient space exists between the rollers of said tubing length to pass therethrough without being pinched closed and a clamped position in which the rollers are tightly pressed together to pinch closed the tubing length therebetween, means within the orifice of said extruder for introducing a gas under pressure into the interior of the length of tubing extruded therefrom, means circumscribing said tubing immediately adjacent said extruder orifice for blowing cooling air along the exterior surface of said tubing in the direction of said first set of roller pairs, means for rotating the rollers of each set of rollers at a predetermined and different velocity, the rollers of the set of rollers most remote from said orifice rotating at a higher velocity than the other set of rollers nearest the extruder, and means supporting each of said roller sets for movement of each said set along the length of the tubing toward or away from said extruder orifice, said supporting means supporting at least one of said roller sets within a cut-out in a platform supported for movement relative to the other roller set by a plurality of threaded rods extending through holes in said platform, a rotatable collar engaging annular grooves in said platform concentrically of each of said holes, each said collar having a threaded central opening engaging the threads of said rod and being movable lengthwise of the rod when rotated, said rollers being engaged by means to rotate them simultaneously for movement of said collars and platforms lengthwise of the rods.

10. The apparatus of claim 9 wherein said means engaging said collars is a chain passing around said rollers in engagement with teeth on the outer periphery of each of said rollers and a motor with a gear engaging said chain to drive it for rotation of said collars.

* * * * *